US012803649B2

(12) United States Patent
Peng et al.

(10) Patent No.: US 12,803,649 B2
(45) Date of Patent: Nov. 17, 2026

(54) REPEATER CONTROL METHOD AND REPEATER

(71) Applicant: VIVO MOBILE COMMUNICATION CO., LTD., Dongguan (CN)

(72) Inventors: Shuyan Peng, Dongguan (CN); Huan Wang, Dongguan (CN); Jinhua Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 261 days.

(21) Appl. No.: 18/422,969

(22) Filed: Jan. 25, 2024

(65) Prior Publication Data

US 2024/0162973 A1 May 16, 2024

Related U.S. Application Data

(63) Continuation of application No. PCT/CN2022/109109, filed on Jul. 29, 2022.

(30) Foreign Application Priority Data

Jul. 30, 2021 (CN) ......................... 202110873151.8

(51) Int. Cl.
*H04B 7/155* (2006.01)
*H04L 5/14* (2006.01)

(52) U.S. Cl.
CPC ..... *H04B 7/15507* (2013.01); *H04B 7/15557* (2013.01); *H04L 5/1469* (2013.01); *H04B 7/15528* (2013.01)

(58) Field of Classification Search
CPC ............ H04B 7/15507; H04B 7/15528; H04B 7/15557; H04L 5/1469; H04W 52/0206
See application file for complete search history.

(56) References Cited

U.S. PATENT DOCUMENTS

2011/0096687 A1 4/2011 Döttling
2013/0021932 A1 1/2013 Damnjanovic et al.
2016/0204847 A1* 7/2016 Ryu ...................... H04W 72/51 455/7

(Continued)

FOREIGN PATENT DOCUMENTS

CN 1913392 A 2/2007
CN 101420702 A 4/2009

(Continued)

OTHER PUBLICATIONS

ZTE Corporation, "Discussion on sync issues for TDD repeater", 3GPP TSG-RAN WG4 Meeting # 98-bis-e, E-meeting, Apr. 12-20, 2021, R4-2106603.

(Continued)

*Primary Examiner* — Shah M Rahman
(74) *Attorney, Agent, or Firm* — The Webb Law Firm

(57) ABSTRACT

A repeater control method includes determining, by a repeater, a target state based on a terminal access status and/or first information indicated by a network-side device; and performing, by the repeater, state switching based on the target state. The target state includes a first state or a second state, the first state indicates that the repeater amplifies and/or forwards an input signal, and the second state indicates that the repeater does not amplify and/or forward an input signal.

20 Claims, 8 Drawing Sheets

300

(56) References Cited

U.S. PATENT DOCUMENTS

| | | | | |
|---|---|---|---|---|
| 2020/0373995 | A1 | 11/2020 | Ashworth et al. | |
| 2020/0403689 | A1 * | 12/2020 | Rofougaran | H04B 7/15514 |
| 2021/0037457 | A1 | 2/2021 | Li et al. | |
| 2021/0037459 | A1 * | 2/2021 | Li | H04B 17/327 |
| 2021/0037460 | A1 * | 2/2021 | Li | H04W 48/16 |
| 2021/0044412 | A1 | 2/2021 | Li et al. | |
| 2021/0050910 | A1 * | 2/2021 | Matsuura | H04B 7/18504 |
| 2021/0194569 | A1 | 6/2021 | Ray Chaudhuri et al. | |
| 2021/0297144 | A1 * | 9/2021 | Abedini | H04B 7/15542 |
| 2021/0328733 | A1 * | 10/2021 | Zhang | H04L 5/0037 |
| 2022/0224400 | A1 * | 7/2022 | Hanson | H04B 7/15507 |
| 2022/0399984 | A1 * | 12/2022 | Luo | H04L 5/14 |
| 2023/0144480 | A1 * | 5/2023 | Liu | H04W 24/02 370/329 |
| 2023/0300936 | A1 * | 9/2023 | Chen | H04W 40/22 370/329 |
| 2024/0187085 | A1 * | 6/2024 | Mcmenamy | H04B 7/15557 |

FOREIGN PATENT DOCUMENTS

| | | | |
|---|---|---|---|
| CN | 102037768 | A | 4/2011 |
| CN | 103748937 | A | 4/2014 |
| CN | 111385079 | A | 7/2020 |

OTHER PUBLICATIONS

Rakuten Mobile, "IAB and Smart Repeater Enhancements in Rel-18", 3GPP TSG RAN Rel-18 Workshop, Jun. 28-Jul. 2, 2021, RWS-210248.

* cited by examiner

REPEATER CONTROL METHOD AND REPEATER

CROSS-REFERENCE TO RELATED APPLICATIONS

This application is a Bypass Continuation Application of International Patent Application No. PCT/CN2022/109109, filed Jul. 29, 2022, and claims priority to Chinese Patent Application No. 202110873151.8, filed Jul. 30, 2021, the disclosures of which are hereby incorporated by reference in their entireties.

BACKGROUND OF THE INVENTION

Field of the Invention

This application pertains to the field of wireless communication technologies, and particularly relates to a repeater control method, a repeater, and a network-side device.

DESCRIPTION OF RELATED ART

In communication technologies, a repeater is introduced to increase radio signal strength, extend a cell coverage area, and the like. For example, in a wireless communication process, a downlink signal sent from a network-side device such as a base station may be received by a repeater and then amplified and forwarded to a terminal to enhance a strength of a downlink signal arriving at the terminal, or an uplink signal from a terminal may be received by a repeater and then amplified and forwarded to a network-side device such as a base station to enhance a strength of an uplink signal arriving at the base station.

SUMMARY OF THE INVENTION

According to a first aspect, a repeater control method is provided, including: determining, by a repeater, a target state based on a terminal access status and/or first information indicated by a network-side device; and performing, by the repeater, state switching based on the target state; where the target state includes a first state or a second state, the first state indicates that the repeater amplifies and/or forwards an input signal, and the second state indicates that the repeater does not amplify and/or forward an input signal.

According to a second aspect, a repeater control method is provided, where the method includes: sending, by a network-side device, first information and/or second information to a repeater; where the first information is used to indicate the repeater to determine a target state, the target state includes a first state or a second state, the first state indicates that the repeater amplifies and/or forwards an input signal, and the second state indicates that the repeater does not amplify and/or forward an input signal; and the second information is used to indicate a terminal access status to the repeater.

According to a third aspect, a repeater control apparatus is provided, applied to a repeater, where the apparatus includes: a determining module, configured to determine a target state based on a terminal access status and/or first information indicated by a network-side device; and a switching module, configured to perform state switching based on the target state; where the target state includes a first state or a second state, the first state indicates that the repeater amplifies and/or forwards an input signal, and the second state indicates that the repeater does not amplify and/or forward an input signal.

According to a fourth aspect, a repeater control apparatus is provided, applied to a network-side device, where the apparatus includes: a second transceiver module, configured to send first information and/or second information to a repeater; where the first information is used to indicate the repeater to determine a target state, the target state includes a first state or a second state, the first state indicates that the repeater amplifies and/or forwards an input signal, and the second state indicates that the repeater does not amplify and/or forward an input signal; and the second information is used to indicate a terminal access status to the repeater.

According to a fifth aspect, a repeater is provided, including a processor, a memory, and a program or instructions stored in the memory and executable on the processor, and when the program or the instructions are executed by the processor, the steps of the method according to the first aspect are implemented.

According to a sixth aspect, a repeater is provided, including a processor and a communication interface, where the communication interface is coupled to the processor, and the processor is configured to run a program or instructions to implement the steps of the method according to the first aspect.

According to a seventh aspect, a network-side device is provided, where the network-side device includes a processor, a memory, and a program or instructions stored in the memory and executable on the processor, and when the program or the instructions are executed by the processor, the steps of the method according to the second aspect are implemented.

According to an eighth aspect, a network-side device is provided, including a processor and a communication interface, where the communication interface is coupled to the processor, and the processor is configured to run a program or instructions to implement the steps of the method according to the second aspect.

According to a ninth aspect, a non-transitory readable storage medium is provided, where a program or instructions are stored in the non-transitory readable storage medium, and when the program or the instructions are executed by a processor, the steps of the method according to the first aspect are implemented, or the steps of the method according to the second aspect are implemented.

According to a tenth aspect, a chip is provided, where the chip includes a processor and a communication interface, the communication interface is coupled to the processor, and the processor is configured to run a program or instructions to implement the steps of the method according to the first aspect or implement the steps of the method according to the second aspect.

According to an eleventh aspect, a computer program/program product is provided, where the computer program/program product is stored in a non-transitory storage medium, and the program/program product is executed by at least one processor to implement the steps of the method according to the first aspect or the second aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

It should be noted that technologies described in the embodiments of this application are not limited to a long term evolution (LTE)/LTE-advanced (LTE-A) system, and may also be used in various wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), reconfigurable intelligent surface (RIS), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communication system.

Figure 1:
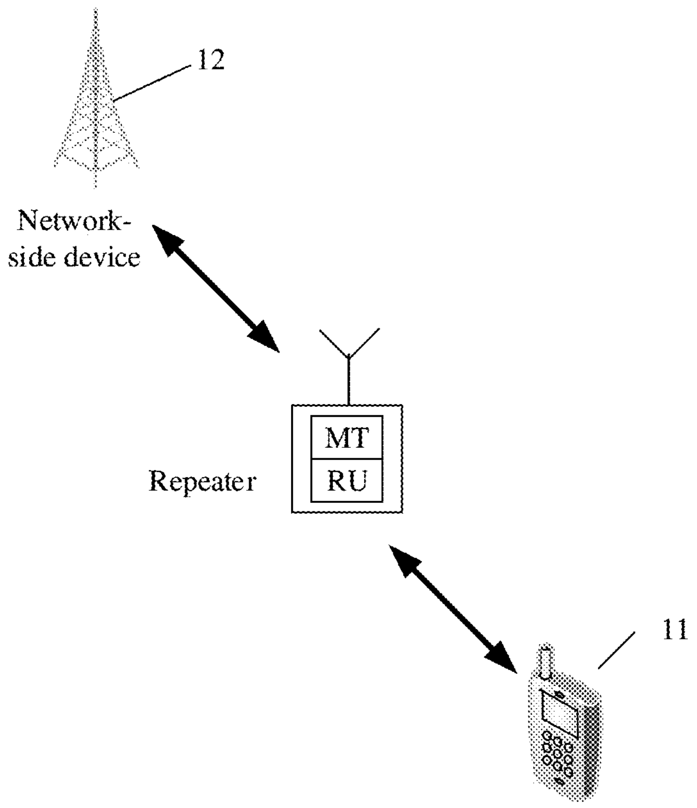
FIG. 1 is a schematic structural diagram of a wireless communication system according to an example embodiment of this application.

FIG. 1 is a schematic structural diagram of a wireless communication system to which the embodiments of this application are applicable. The wireless communication system includes a terminal 11 and a network-side device 12. The terminal 11 may also be referred to as a terminal device or user terminal (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smart watch, a wrist band, earphones, glasses, or the like. It should be noted that a type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless fidelity (WiFi) node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a type of the base station is not limited.

The repeater may be understood as a smart repeater, a signal repeater, and the likeIn the embodiments, the repeater may include a mobile termination (MT) and a radio unit (RU), and the MT is configured to establish a connection to a network-side device (for example, a gNB, a donor node, or a core network node). That is, the network-side device exchanges information with the repeater via the MT, such that the repeater can receive control from the network-side device, or the like. For example, the network-side device can implement control on transmit parameters for the repeater, on/off for the repeater, transmit beam, and the like. The RU is configured to establish a connection to the UE for signaling interaction.

It should be noted that the repeater can be understood as a network node located between the UE and the network-side device and implementing processing of amplification, forwarding, and the like of uplink/downlink signals.

The following describes in detail the technical solution provided in the embodiments of this application by using some embodiments and application scenarios thereof with reference to the accompanying drawings.

Considering that repeaters keeps running once being powered on, if there are no signals to be amplified for a period of time in this case, the repeater also amplifies noise in the communication system, which causes interference and affects wireless communication performance.

Figure 2:
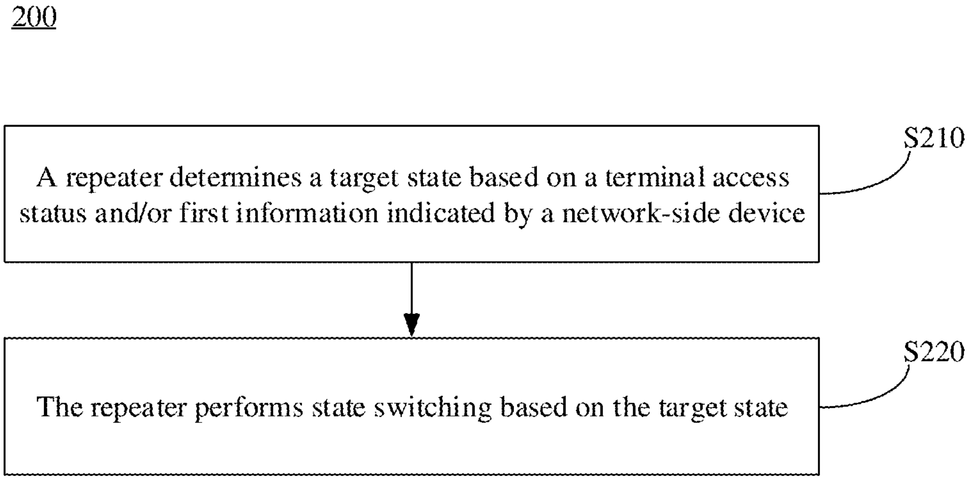
FIG. 2 is a schematic flowchart of a repeater control method according to an example embodiment of this application.

FIG. 2 is a schematic flowchart of a repeater control method 200 according to an example embodiment of this application. The method 200 may be, but is not limited to, performed by a repeater, and may be performed by hardware and/or software installed in the repeater. In this embodiment, the method 200 may include at least the following steps.

S210: The repeater determines a target state based on a terminal access status and/or first information indicated by a network-side device.

The terminal access status refers to whether terminal access is present on the repeater, that is, whether signals to be amplified, forwarded, and the like between the terminal and/or the network-side device are present under the coverage of the repeater. In this embodiment, the terminal access status may be determined autonomously by the repeater, or may be indicated by the network-side device, or the like.

The first information is used to indicate to the repeater a state of the repeater, for example, whether to perform state switching; for another example, the target state to which the repeater needs to be switched, or the like.

Certainly, the target state may include a first state or a second state, and the first state indicates that the repeater (for example, an RU portion) amplifies and/or forwards an input signal (for example, a signal sent by the terminal or the network-side device). The first state can be understood as an ON state, which may include a power-on state, a state in which the RU normally amplifies or transmits an input signal, or the like.

The second state indicates that the repeater does not amplify and/or forward an input signal (for example, a signal sent by the terminal or the network-side device). The second state can be understood as an OFF state, which may include at least one of an RU sleep state, a low output power state, or a power-off state.

It should be noted that depending on the communication design, a low amplification factor state of the repeater may belong to the second state or may belong to the first state, which is not limited herein.

S220: The repeater performs state switching based on the target state.

It can be understood that when the repeater performs state switching based on the target state, if the target state is the same as a current state, the repeater does not perform switching; or if the target state is different from the current state of the repeater, the repeater may switch from the current state to the target state.

In this embodiment, the repeater determines the target state based on the terminal state information and the first information indicated by the network-side device, and performs state switching based on the target state. In this way, the repeater is able to switch between the first state and the second state when signal forwarding or amplification is not required. This implements both power saving and reduces interference caused by noise amplification in the wireless communication system, ensuring quality of wireless communication.

For example, assuming that there is no signal that needs to be amplified for a period of time on the repeater, the repeater may switch to the second state (that is, the OFF state), so as to avoid amplification of interfering signals and noise from other cells, ensuring signal reception quality of the current cell; or to avoid transmitting side lobes of transmitted signals and noise signals of the current cell to other cells, ensuring signal reception quality of other cells.

Figure 3:
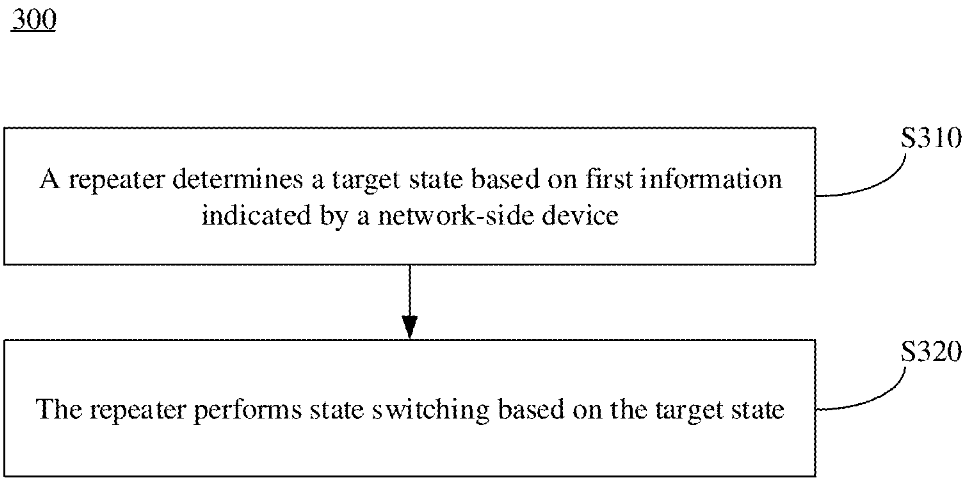
FIG. 3 is a schematic flowchart of a repeater control method according to another example embodiment of this application.

FIG. 3 is a schematic flowchart of a repeater control method 300 according to an example embodiment of this application. The method 300 may be, but is not limited to, performed by a repeater, and may be performed by hardware and/or software installed in the repeater. In this embodiment, the method 300 may include at least the following steps.

S310: The repeater determines a target state based on first information indicated by a network-side device.

It can be understood that, in addition to the related descriptions in the method embodiment 200, as a possible implementation, the first information may include at least one of the following (101) to (113):

(101) First indication information, used to indicate that the repeater is to perform state switching or is not to perform state switching.

The first indication information may be downlink control information (DCI), media access control-control element (MAC CE), slot format indication (SFI), radio resource control (RRC) signaling, or the like.

Using the DCI as an example herein, the network-side device may indicate explicitly or implicitly via DCI that the repeater is to perform switching or is not to perform switching. For example, one code point in the DCI may be used to indicate that the repeater performs state switching and another code point is used to indicate that the repeater does not perform state switching.

For another example, one code point in the DCI may alternatively be used to indicate the repeater to perform state switching, for example, the repeater switches from an ON state to an OFF state or from an OFF state to an ON state.

(102) Second indication information, used to indicate that the repeater is in the first state or the second state.

Similar to the first indication information, the second indication information may also be DCI, MAC CE, SFI, RRC signaling, or the like.

Still using the DCI as an example herein, the network-side device may indicate explicitly or implicitly that the repeater is in the first state or the second state.

For example, one code point in the DCI may be used to indicate that the repeater is in the first state and another code point is used to indicate that the repeater is in the second state.

For another example, one code point in the DCI may alternatively be used to indicate that the repeater is in the first state 1 (for DRX configuration 1), another code point indicates that the repeater is in the first state 2 (for DRX configuration 2), and a third code point indicates that the repeater is in the second state.

For another example, one code point indicates that the repeater is in the first state 1 (corresponding to an amplification factor alpha 1), another code point indicates that the repeater is in the first state 2 (corresponding to an amplification factor alpha 2), and a third code point indicates that the repeater is in the second state.

Furthermore, the second indication information is used to indicate that the repeater is in the first state or the second state, where an indication manner may include at least one of the following (1021) to (1024).

(1021) Indicating that a resource of the repeater in a downlink (DL) time unit is in the ON state (that is, the first state).

(1022) Indicating that a resource of the repeater in an uplink (UL) time unit is in the ON state.

(1023) Indicating that a resource of the repeater in a flexible time unit is in the ON state if at least part of the following conditions (a) to (e) are met:

(a) a semi-persistent UL/DL configuration is present in the flexible time unit;

(b) dynamic UL/DL scheduling is present in the flexible time unit;

(c) dynamic indication information for the base station is present in the flexible time unit;

(d) scheduling of physical random access channel (PRACH), physical uplink control channel (PUCCH), or the like is present in the flexible time unit; or (e) scheduling of at least one of a channel state information reference signal (CSI-RS), a synchronization signal block (SSB), or a common search space (CSS) is present in the flexible time unit.

(1024) Indicating that the repeater is the OFF state when resources (which may be time domain resources and/or frequency domain resources) are not available (NA).

Optionally, the time unit referred to in this embodiment and subsequent embodiments may be a sub-slot, slot, subframe, frame, symbol, second (s), millisecond (ms), or the like, which is not limited herein.

(103) Data scheduling information.

The data scheduling information may be used for scheduling UL data, DL data, and the like.

Based on this, in a case that the first information includes the data scheduling information, the repeater determines the target state based on the data scheduling information indicated by the network-side device, which may include at least one of the following (1031) to (1033).

(1031) In a case that scheduling data indicated by the data scheduling information is UL data and/or DL data, determining that the target state is the first state (that is, the ON state).

For example, if the scheduling data indicated by the data scheduling information is UL data and/or DL data in time unit n, the state of the repeater in the time unit n is the first state, that is, the ON state.

(1032) In a case that the data scheduling information schedules no UL data or DL data, determining that the target state is the second state.

For example, if the data scheduling information schedules no UL data or DL data in the time unit n, the state of the repeater in the time unit n is the second state, that is, the OFF state.

(1033) In a case that the scheduling data indicated by the data scheduling information is predetermined data, determining that the target state is the first state, where the predetermined data includes at least one of PRACH, PUCCH, sounding reference signal (SRS), CSI-RS, SSB, or CSS (for example, type 1 CSS).

(104) Time division duplexing (TDD) configuration information.

In a case that the first information includes the TDD configuration information, the repeater determines the target state based on the TDD configuration information indicated by the network-side device, which may include at least one of the following (1041) to (1043).

(1041) In a case that the TDD configuration includes an UL configuration and/or a DL configuration, determining that the target state is the first state.

For example, if the TDD configuration includes an UL configuration or a DL configuration in the time unit n, the state of the repeater in the time unit n is the first state, that is, the ON state.

(1042) In a case that the TDD configuration includes a flexible configuration, determining that the target state is the second state.

For example, if the TDD configuration includes a flexible configuration in the time unit n, the state of the repeater in the time unit n is the second state, that is, the OFF state.

(1043) Determining the target state based on a ratio of the TDD configurations, where the ratio of configurations is a ratio between a first configuration and a second configuration, the first configuration includes an UL configuration and/or a DL configuration, and the second configuration includes a flexible configuration.

For example, in a case that the ratio is greater than a second threshold, the target state is determined to be the first state; or in a case that the ratio is not greater than a second threshold, the target state is determined to be the second state, where the second threshold may be specified by a protocol, configured by the higher layer, or configured by the network.

(105) Beam information

The beam information may be a beam direction, the number of beams, or the like.

(106) Beam identifier (ID) or beam index

For example, for (105) and (106), it is considered by default that the target state is the first state when the load information is included in the first information; otherwise, it is considered by default that the target state is the second state.

(107) Transmit power of the repeater

For example, in a case that the transmit power of the repeater is greater than a third threshold, the target state is determined to be the first state; or in a case that the transmit power of the repeater is not greater than a third threshold, the target state is determined to be the second state, where the third threshold may be specified by a protocol, configured by the higher layer, or configured by the network.

(108) Discontinuous reception (DRX) configuration information

For example, in a case that the DRX configuration information is DRX configuration 1 or DRX configuration 2, the target state is determined to be the first state.

(109) Terminal identification information

For example, in a case that a terminal corresponding to the terminal identification information is a terminal under the coverage of the repeater, it is determined that the target state is the first state; otherwise, it is determined that the target state is the second state.

For another example, in a case that the first information includes the terminal identification information, it is considered by default that the target state is the first state; otherwise, it is considered by default that the target state is the second state.

(110) Load (traffic load) information

For example, in a case that the load information is greater than a third threshold, it is determined that the target state is the first state; otherwise, it is determined that the target state is the second state.

For another example, in a case that the first information includes the load information, it is considered by default that the target state is the first state; otherwise, it is considered by default that the target state is the second state.

(111) Target resource information, where the target resource information includes at least one of hard resource information, soft resource information, or unavailable resource information;

In a case that the first information includes the target resource information, the repeater determines the target state based on the target resource information indicated by the network-side device, which may include at least one of the following (1111) to (1113).

(1111) in a case that the target resource information is the hard resource, determining that the target state is the first state;

(1112) in a case that the target resource information is the unavailable resource, determining that the target state is the second state; or (1113) in a case that the target resource information is the soft resource, determining that the target state is the second state or the first state.

If the target resource information is the soft resource, it indicates DRX configuration 1, or indicates magnification factor alpha1, or indicates a pending first state or second state.

Based on this, in a possible implementation, in a case that the target resource information is the soft resource and third indication information sent by the network-side device is received, the target state is determined based on the third indication information, where the third indication information is used to indicate that the repeater is in the first state or the second state; and in a case that the target resource information is the soft resource, it is determined by default that the target state is the second state.

For example, if the soft resource information indicates a pending first state and second state, the network-side device such as a base station may dynamically indicate via the third indication information that the repeater is in the first state or in the second state within the soft resource, and/or if the base station does not dynamically indicate that the repeater is in the first state within the soft resource, it is considered by default that the repeater is in the second state.

(112) Master cell group (MCG) configuration information (113) Secondary cell group (SCG) configuration information In a case that the first information includes MCG configuration information and/or SCG configuration information (that is, the repeater is in a dual-connectivity state), the repeater determines the target state based on the MCG configuration information and/or the SCG configuration information indicated by the network-side device, including at least one of the following (1131) or (1132).

(1131) in a case that both the MCG configuration information and the SCG configuration information indicate a state of the repeater being the second state, determining that the target state is the second state; or (1132) in a case that the MCG configuration information or the SCG configuration information indicates a state of the repeater being the first state, determining that the target state is the first state.

Alternatively, in a possible implementation, the repeater may alternatively determine the target state based only on the MCG configuration information. For the determining process, refer to related implementations in the foregoing (101) to (111), or the like, which is not limited herein to avoid repetition.

In another possible implementation, in addition to an operating state of the repeater, the MCG configuration information and the SCG configuration information may indicate an operating time, an operating frequency, or the like of the repeater, which is described hereinafter with reference to (1133) to (1137).

(1133) In a case that the MCG configuration information indicates an operating time range of the repeater being a first time range and the SCG configuration information indicates the operating time range of the repeater being a second time range, the operating time range of the repeater is a sum of the first time range and the second time range.

For example, assuming that the first time range is (T1, T2) and the second time range is (T2, T3), the operating time range of the first repeater is (T1, T2, T3).

(1134) In a case that the MCG configuration information indicates an operating time range of the repeater being a first time range and the SCG configuration information indicates the operating time range of the repeater being a second time range, the operating time range of the repeater is an overlapping portion between the first time range and the second time range.

For example, assuming that the first time range is (T1, T2) and the second time range is (T2, T3), the operating time range of the first repeater is (T2).

(1135) In a case that the MCG configuration information indicates an operating frequency range of the repeater being a first frequency range and the SCG configuration information indicates the operating frequency range of the repeater being a second frequency range, the operating frequency range of the repeater is a sum of the first frequency range and the second frequency range.

For example, assuming that the first frequency range is (F1, F2) and the second frequency range is (F2, F3), then the operating frequency range of the first repeater is (F1, F2, F3).

(1136) In a case that the MCG configuration information indicates an operating frequency range of the repeater being a first frequency range and the SCG configuration information indicates the operating frequency range of the repeater being a second frequency range, the operating frequency range of the repeater is an overlapping portion between the first frequency range and the second frequency range.

For example, assuming that the first frequency range is (F1, F2) and the second frequency range is (F2, F3), the operating frequency range of the first repeater is (F2).

(1137) In a case that the MCG configuration information indicates the operating time range of the repeater being a first time range and the operating frequency range being a first frequency range, and that the SCG configuration information indicates the operating time range of the repeater being a second time range and the operating frequency range being a second frequency range, the operating time range of the repeater is an overlapping portion between the first time range and the second time range portion, and the operating frequency range of the repeater is a sum of the first frequency range and the second frequency range.

Furthermore, in addition to the foregoing (1133) to (1137), when the MCG configuration information and SCG configuration information are different, the repeater may determine the operating frequency range of the RU portion based only on the SCG configuration information. However, if the repeater does not operate for a period of time after obtaining the SCG configuration information, the repeater stops amplification/forwarding or the like for the SCG band.

It should be noted that, on the basis of the implementations described above, if the first information is transmitted via the fifth information, the fifth information may further carry at least one of a start time, an end time, or duration of the target state of the repeater.

In addition, a validity time of the fifth information may be determined based on a first value and a first time unit in which the fifth information is received; or the validity time of the fifth information is determined based on seventh indication information sent by the network-side device.

For example, assuming that the first value is L and the repeater receives the fifth information in a time unit n, the validity time of the first information indicated by the fifth information may be a time unit n+L.

For another example, assuming that the first value is L and the repeater uses, in the time unit n, the first information indicated by the fifth information, a time unit for receiving the fifth information may be a time unit n−L.

Optionally, the first value is related to subcarrier spacing (SCS) or the first value is indicated by the network side, specified by the protocol, or configured by the higher layer, or the like, for example, being indicated using the fifth information, which is not limited herein.

It can be understood that if the first value is related to the SCS, a relationship between the first value and the SCS may be predefined. For example, when SCS=15 kHz, the first value is K1; when SCS=30 kHz, the first value is K2; when SCS=60 kHz, the first value is K3; and when SCS=120 kHz, the first value is K4. In this case, if the validity time of the fifth information needs to be determined, the first value may be determined based on the predefined relationship between the first value and the SCS.

It should be noted that for a validity time of the second information or other indication information, reference may be made to the foregoing descriptions about the validity time of the fifth information, which is not repeated subsequently to avoid repetition.

S320: The repeater performs state switching based on the target state.

It can be understood that for the implementation process of S320, reference may be made to the related descriptions in the method embodiment 200, with the same technical effects achieved. To avoid repetition, details are not repeated herein.

In this embodiment, the repeater performs determining and switching of the target state based on the first information indicated by the network-side device. In this way, the repeater implements effective signal forwarding and amplification or the like in the first state, or may be in the second state to reduce interference within the system, ensuring wireless communication quality.

Figure 4A:
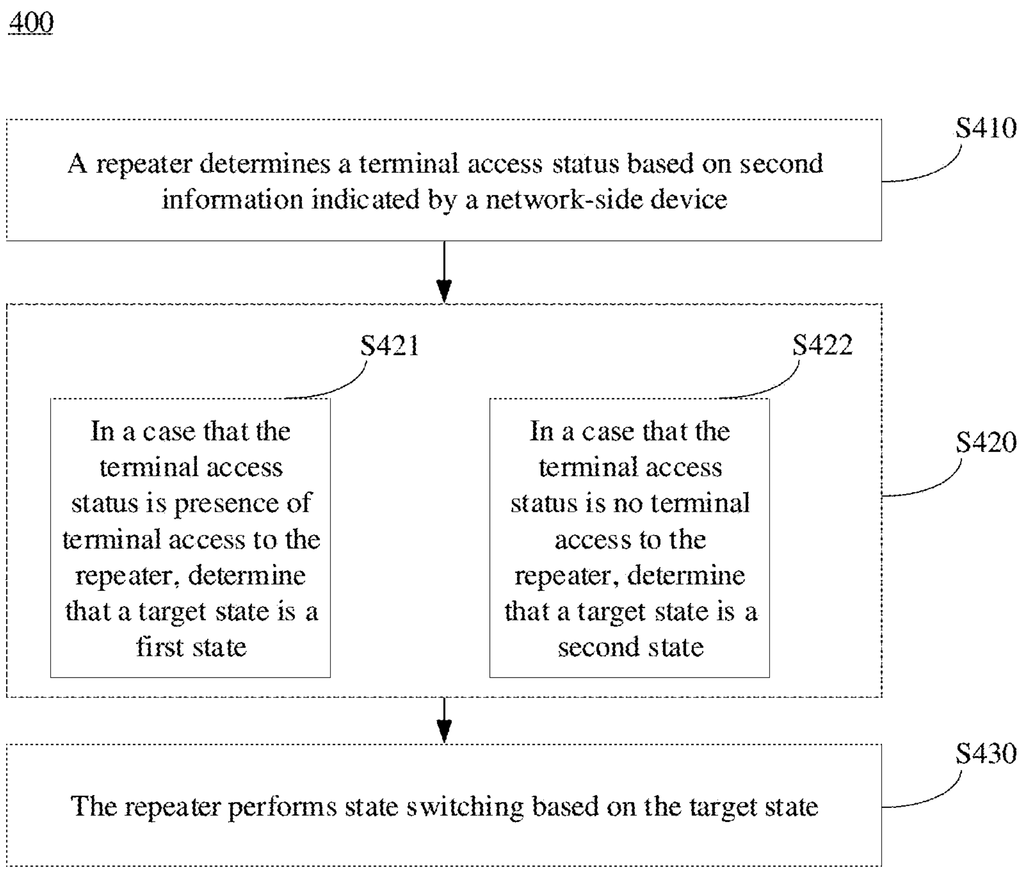
FIG. 4A is a schematic flowchart of a repeater control method according to another example embodiment of this application.

FIG. 4A is a schematic flowchart of a repeater control method 400 according to an example embodiment of this application. The method 400 may be, but is not limited to, performed by a repeater, and may be performed by hardware and/or software installed in the repeater. In this embodiment, the method 400 may include at least the following steps.

S410: The repeater determines a terminal access status based on second information indicated by a network-side device.

It should be noted that the network-side device indicates the terminal access status to the repeater via the second information, where the second information may include at least one of the following (201) to (206).

(201) Fourth indication information, used to indicate presence or absence of terminal access to the repeater.

The fourth indication information may be DCI, RRC, MAC CE, or the like.

Using DCI as an example herein, the network-side device may explicitly or implicitly indicate the terminal access status via DCI.

For example, one code point indicates that the terminal access status is presence of terminal access to the repeater and another code point indicates that the terminal access status is no terminal access to the repeater.

(202) SSB configuration information

If the repeater detects SSB information sent by the terminal or sent by the network-side device, the repeater considers presence of UE access; if no SSB information is detected, the repeater considers no terminal access.

(203) Paging configuration information

If the repeater detects, at a paging position, paging information sent by the network side or sent by the terminal, the repeater considers presence of UE access; if no paging information is detected, the repeater considers no terminal access.

(204) Control resource set (CORESET) configuration information

If the repeater detects, at a CORESET position, control information sent by the network side or sent by the UE, the repeater considers presence of UE access; if no control information is detected, the repeater considers no terminal access.

(205) Search space configuration information

If the repeater detects, at a configured search space position, control information sent by the network side or sent by the terminal, the repeater considers presence of terminal access; if no control information is detected, the repeater considers no terminal access.

(206) Data scheduling information

If the repeater detects scheduling information from the network side or data transmission from the terminal, the repeater considers presence of UE access; if no scheduling information or data transmission is detected, the repeater considers no terminal access; or

- in a case that scheduling data indicated by the data scheduling information is UL data and/or downlink DL data, it is determined that the terminal access status is presence of terminal access to the repeater; or
- in a case that the data scheduling information schedules no UL data or downlink DL data, it is determined that the terminal access status is no terminal access to the repeater.

In an implementation, the second information may be sent to the repeater after being determined by the network-side device based on any one of a second measurement result, a third measurement result, a fourth measurement result, and a fifth measurement result.

The second measurement result is a measurement result obtained through measurement performed by a terminal on first downlink measurement information sent by the network-side device, and the first downlink measurement information is information sent by the network-side device to the terminal in a case that the repeater is in the second state.

The third measurement result is a measurement result obtained through measurement performed by the network-side device on first uplink measurement information sent by the terminal, and the first uplink measurement information is information sent by the terminal to the network-side device in the case that the repeater is in the second state.

The fourth measurement result is a measurement result obtained through measurement performed by the terminal on second downlink measurement information sent by the network-side device, and the second downlink measurement information is information sent by the network-side device to the terminal in a case that the repeater is in the first state.

The fifth measurement result is a measurement result obtained through measurement performed by the network-side device on second uplink measurement information sent by the terminal, and the second uplink measurement information is information sent by the terminal to the network-side device in the case that the repeater is in the first state.

In this case, to avoid impact of the repeater on the second measurement result, third measurement result, fourth measurement result, and fifth measurement result, and to ensure accuracy of the measurement result, before determining the terminal access status based on the second information indicated by the network-side device, the repeater may further receive fifth indication information sent by the network-side device, where the fifth indication information at least carries a switching command and/or related time information. The switching command is used to instruct the repeater to switch to the first state or second state, and the related time information is information about a time at which the repeater switches to the first state or second state, such that the repeater may perform state switching according to the switching command and/or the related time information.

Optionally, the related time information is setting information of a measurement signal notified by the network-side device to the repeater, so that the repeater is switched off or on at a corresponding moment. Based on this, in this embodiment, the related time information at least may include at least one of the following: transmission time information for the first downlink measurement information; transmission time information for the first uplink measurement information; transmission time information for the second downlink measurement information; or transmission time information for the second uplink measurement information. In addition, at least one of a start time, an end time, or a duration of the first state or the second state may also be included in the related time information depending on different measurement requirements.

Figure 4B:
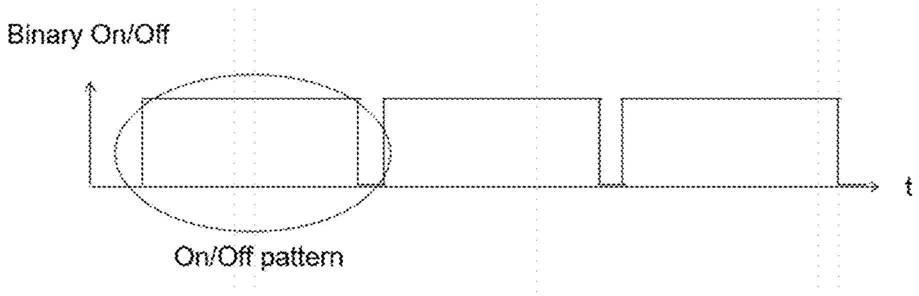
FIG. 4B is a schematic diagram of an on/off pattern according to an example embodiment of this application.

In a possible implementation, the related time information may alternatively be indicated by an on/off pattern shown in FIG. 4B, and the on/off pattern is used when the repeater is in an active/on state.

Based on this, assuming that the network-side device is a donor node, this embodiment describes the process of determining the second measurement result, the third measurement result, the fourth measurement result, and the fifth measurement result using different examples as follows.

Example 1: The donor node uses the fifth indication information to indicate a time range in which the repeater is temporarily turned off. In the time range in which the repeater is turned off, the donor transmits a downlink measurement signal (for example, an aperiodic CSI-RS) to at least one terminal under the coverage of the repeater, and then, based on a measurement result (that is, the second measurement result) reported by the terminal, the donor determines whether it is necessary to turn off at least downlink amplification of the repeater, that is, whether terminal access is present, and sends a determining result to the repeater in a form of the second information.

Example 2: The donor node uses the fifth indication information to indicate a time range in which the repeater is temporarily turned off. In the time range in which the repeater is turned off, the donor instructs the UE to send an uplink measurement signal (for example, a periodic SRS, semi-persistent scheduling SRS, or an aperiodic SRS), and the donor determines, based on a measurement result (that is, the third measurement result), whether it is necessary to turn off at least uplink amplification of the repeater, that is, whether terminal access is present, and sends a determining result to the repeater in a form of the second information.

Example 3: The donor node uses the fifth indication information to indicate a time range in which the repeater is temporarily turned on. In the time range in which the repeater is turned on, the donor transmits a downlink measurement signal (for example, an SSB or a CSI-RS) to at least one terminal under the coverage of the repeater, and then, based on a measurement result (that is, the fourth measurement result) reported by the terminal, the donor determines whether it is necessary to turn on at least downlink amplification of the repeater, that is, whether terminal access is present, and sends a determining result to the repeater in a form of the second information.

Example 4: The donor node uses the fifth indication information to indicate a time range in which the repeater is temporarily turned on. In the time range in which the repeater is turned on, the donor instructs the UE to send an uplink measurement signal (for example, a periodic SRS, semi-persistent SRS, or an aperiodic SRS), and the donor determines, based on a measurement result (that is, the fifth measurement result), whether it is necessary to turn on at least uplink amplification of the repeater, that is, whether terminal access is present, and sends a determining result to the repeater in a form of the second information.

S420: The repeater determines a target state based on the terminal access status.

It can be understood that, in addition to the related descriptions in the method embodiments 200 and 300, as a possible implementation, the implementation process of S420 may further include the following S421 and/or S422, still with reference to FIG. 4A.

S421: In a case that the terminal access status is presence of terminal access to the repeater, determine that the target state is the first state.

The repeater switches to or remains in the ON state in a case that the terminal and/or the network-side device needs to perform information transmission under the coverage of the repeater.

S422: In a case that the terminal access status is no terminal access to the repeater, determine that the target state is the second state.

That is, the repeater switches to or remains in the OFF state in a case that no information transmission needs to be performed by the terminal and/or the network-side device under the coverage of the repeater.

S430: The repeater performs state switching based on the target state.

It can be understood that for the implementation process of S430, reference may be made to the related descriptions in the method embodiments 200 to 400, with the same technical effects achieved. To avoid repetition, details are not repeated herein.

In this embodiment, the repeater determines the terminal access status based on the second information, and then performs determining and switching of the target state based on the terminal access status. In this way, the repeater implements effective signal forwarding and amplification, or the like in the first state, or may be in the second state to reduce interference within the system, ensuring wireless communication quality.

Figure 5:
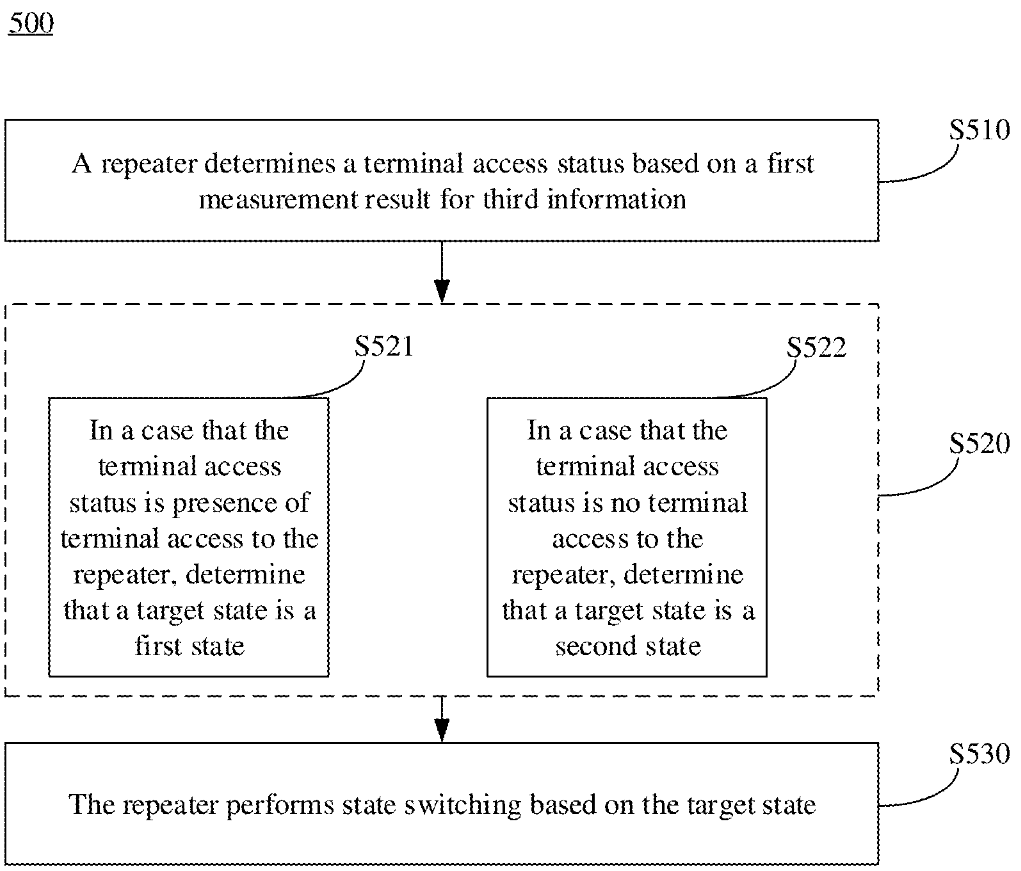
FIG. 5 is a schematic flowchart of a repeater control method according to another example embodiment of this application.

FIG. 5 is a schematic flowchart of a repeater control method 500 according to an example embodiment of this application. The method 500 may be, but is not limited to, performed by a repeater, and may be performed by hardware and/or software installed in the repeater. In this embodiment, the method 500 may include at least the following steps.

S510: The repeater determines a terminal access status based on a first measurement result for third information.

The third information may be uplink measurement information sent by the terminal or downlink measurement information sent by the network-side device under the coverage of the repeater. For example, in this embodiment, the third information at least may include at least one of SRS, PRACH, physical uplink shared channel (PUSCH), PUCCH, or demodulation reference signal (DMRS).

In a possible implementation, that the repeater determines the terminal access status based on the first measurement result for the third information includes at least one of (301) to (304) below.

(301) in a case that the first measurement result is no uplink signal being detected, determining that the terminal access status is no terminal access to the repeater;

(302) in a case that the first measurement result is less than a first threshold, determining that the terminal access status is no terminal access to the repeater;

(303) in a case that the first measurement result is not less than a first threshold, determining that the terminal access status is presence of terminal access to the repeater; or (304) in a case that the first measurement result is an uplink signal being detected, determining that the terminal access status is presence of terminal access to the repeater.

The first threshold may be specified by the protocol, configured by the higher layer, or configured by the network side, which is not limited herein.

In addition, a measurement time for measuring the third information by the repeater may alternatively be specified by the protocol, configured by the higher layer, indicated by the network, configured by the network, or the like. For example, the repeater may receive sixth indication information sent by the network-side device, where the sixth indication information carries measurement time activation information and/or measurement time indication information; and the repeater determines a target measurement time based on the measurement time activation information and/or the measurement time indication information, and performs measurement on the third information based on the target measurement time to obtain the first measurement result.

The measurement time may be in a periodic configuration or in a semi-persistent periodic configuration. The sixth indication information may be a DCI activation indication, a wake-up signal (WUS), or the like. A detection time for the sixth indication information (which may also be understood as a detection time for the measurement time activation information or the measurement time indication information) may be specified by the protocol, configured by the higher layer, configured by the network, or the like.

For example, the network-side device may configure a period of semi-persistent detection and determine an activation moment of the measurement time according to a DCI activation instruction. If the DCI is activated, the repeater performs measurement on the third information during a next configured detection period.

For another example, the network-side device configures a semi-persistent detection period and a dynamical activation indication detection time. In this case, the repeater may listen to dynamic indication signaling DCI during the dynamical activation indication detection time. If dynamic indication signaling DCI (that is, WUS signaling) is detected, the repeater switches to the ON state.

Further, in an implementation, the repeater switches to the first state, in a case that the sixth indication information carries the measurement time activation information and the repeater is in the second state.

S520: The repeater determines a target state based on the terminal access status.

S521: In a case that the terminal access status is presence of terminal access to the repeater, determine that the target state is the first state.

S522: In a case that the terminal access status is no terminal access to the repeater, determine that the target state is the second state.

S530: The repeater performs state switching based on the target state.

It can be understood that for the implementation processes of S520, S521, S522, and S530, reference may be made to the related descriptions in the method embodiments 200 to 400, with the same technical effects achieved. To avoid repetition, details are not repeated herein.

In this embodiment, the repeater determines the terminal access status based on the first measurement result, and then performs determining and switching of the target state based on the terminal access status. In this way, the repeater implements effective signal forwarding and amplification, or the like in the first state, or may be in the second state to reduce interference within the system, ensuring wireless communication quality.

Figure 6A:
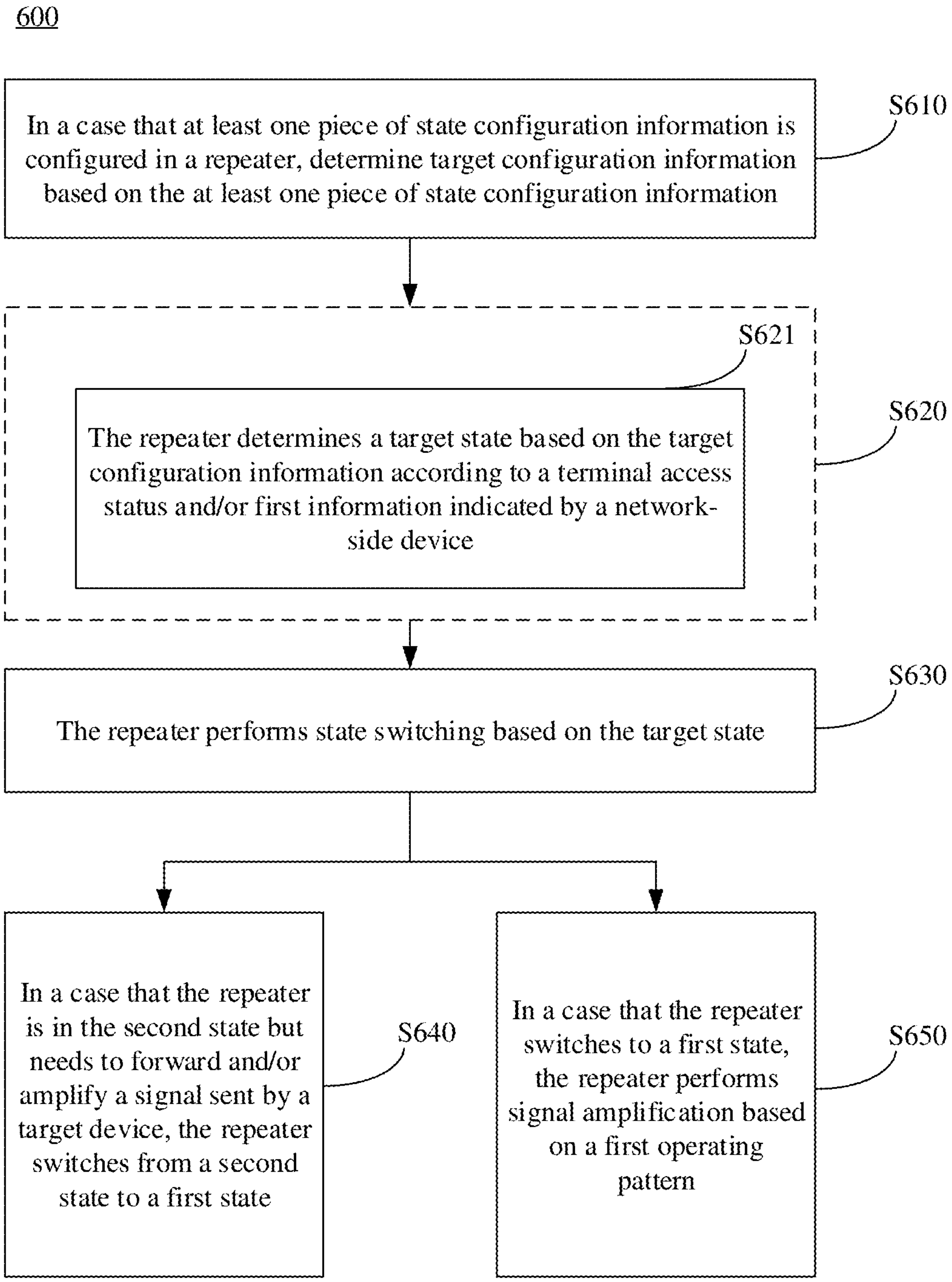
FIG. 6A is a schematic flowchart of a repeater control method according to another example embodiment of this application.

FIG. 6A is a schematic flowchart of a repeater control method according to an example embodiment of this application. The method 600 may be, but is not limited to, performed by a repeater, and may be performed by hardware and/or software installed in the repeater. In this embodiment, the method 600 may include at least the following steps.

S610: In a case that at least one piece of state configuration information is configured in the repeater, determine target configuration information based on the at least one piece of state configuration information.

A state determining rule for the repeater is configured in the state configuration information. For example, in the state configuration information, the following may be configured: whether the repeater determines the target state based on the terminal access status, or determines the target state based on the first information indicated by the network-side device, or determines the target state based on the terminal access status and the first information indicated by the network-side device; or the repeater determines a time of the target state, or parameters such as timing of state switching during determining of the target state, and so on, which are not limited by this embodiment.

In an implementation, the at least one piece of state configuration information may be configured based on a predetermined dimension, where the predetermined dimension may include at least one of the following (401) to (408).

(401) UL dimension (402) DL dimension (403) Time unit dimension

The foregoing (401) to (403) can be understood as: a set of state configuration information can be independently configured based on the UL dimension, and/or, a set of state configuration information can be independently configured based on the DL dimension. In this embodiment, due to asymmetry of UL and DL, a set of state configuration information may alternatively be configured based on the time unit without considering UL/DL configurations.

(404) Time division multiplexing (TDM) dimension (405) Frequency division multiplexing (FDM) dimension (406) Space division multiplexing (SDM) dimension (404) to (406) can be understood as that a set of state configuration information can be independently configured based on the TDM dimension, a set of state configuration information can be independently configured based on the FDM dimension, and a set of state configuration information can be independently configured based on the SDM dimension.

In this case, the repeater may apply a corresponding configuration based on a multiplexing mode. For example, if the multiplexing mode is TDM, state configuration information configured based on the TDM dimension may be applied.

(407) Frequency domain dimension, where the frequency domain dimension includes at least one frequency domain subdimension.

That is, a set of state configuration information is independently configured per frequency range.

(408) Time domain dimension, where the time domain dimension includes at least one time domain subdimension.

That is, a set of state configuration information is independently configured per time range.

It should be noted that the state configuration information based on different dimension configurations described in the foregoing (401) to (408) can be used jointly or individually, which is not limited herein.

S620: The repeater determines a target state based on a terminal access status and/or first information indicated by a network-side device.

It can be understood that, in addition to the related descriptions in the method embodiments 200 to 500, as a possible implementation, the implementation process of S620 may further include the following S621, still with reference to FIG. 6A.

S621: The repeater determines the target state based on the target configuration information according to the terminal access status and/or the first information indicated by the network-side device.

Based on different target configuration information, the implementation process of S621 is different. For example, it is assumed that the target configuration information is configured as: the repeater determines the terminal access status based on the first measurement result and determines the target state based on the terminal access status. In this case, during determining of the target state, the repeater needs to determine the terminal access status based on the first measurement result, and then determine the target state based on the terminal access status.

S630: The repeater performs state switching based on the target state.

The target state includes a first state or a second state, the first state indicates that the repeater amplifies and/or forwards an input signal, and the second state indicates that the repeater does not amplify and/or forward an input signal.

It can be understood that for the implementation process of S630, reference may be made to the related descriptions in the method embodiments 200 to 500 and details are not repeated herein to avoid repetition.

S640: In a case that the repeater is in the second state but needs to forward and/or amplify a signal sent by a target device, the repeater switches from the second state to the first state.

The target device is a terminal and/or a network-side device under a coverage of the repeater. That is, for a repeater that is in the OFF state, if under the coverage of the repeater, there is a signal between the terminal and/or the network-side device that needs to be forwarded and amplified by the repeater, the repeater may switch from the OFF state to the ON state to perform forwarding and amplification of the signal. In a possible implementation, upon receiving fourth information sent by the network-side device, the repeater may determine based on the fourth information whether to forward and/or amplify the signal sent by the target device. For the process of determining the fourth information, reference may be made to the foregoing description about the process of determining the second information, and details are not repeated herein to avoid repetition.

S650: In a case that the repeater switches to the first state, the repeater performs signal amplification based on a first operating pattern.

At least one operating pattern is configured for the repeater, at least one amplification factor of the repeater is configured for each of the operating patterns, different amplification factors correspond to different time-domain information and/or frequency-domain information, and the first operating pattern belongs to the at least one operating pattern.

Figure 6B:
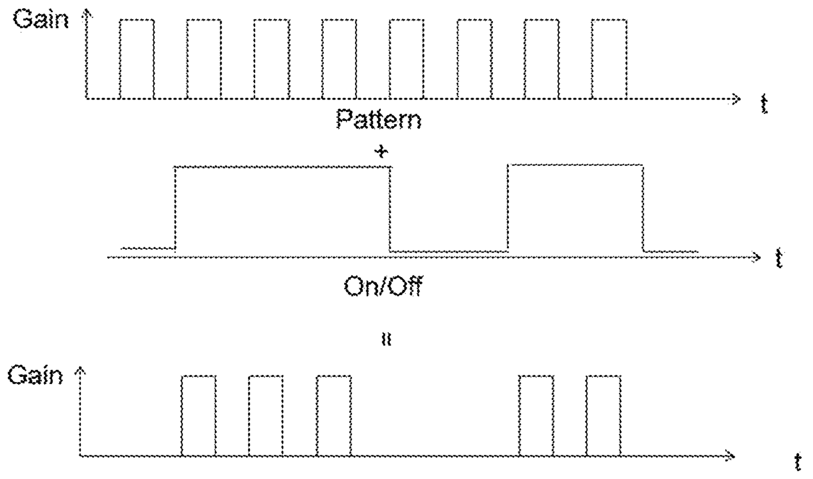
FIG. 6B and FIG. 6C are schematic diagrams of an application process of an operating pattern according to an example embodiment of this application.
Figure 6C:
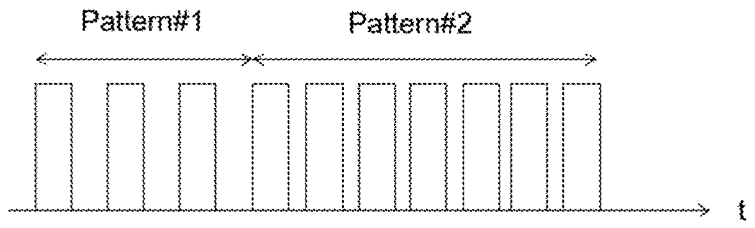

For example, referring to FIG. 6B, assuming that “on” means that the repeater operates according to a preset operating pattern, and “off” means that the repeater is turned off, a variety of operating patterns may be set, and in a case that the first condition is met, the repeater may perform pattern switching. For example, the repeater switches from a first operating pattern (pattern #1 as shown in FIG. 6C) to a second operating pattern (pattern #2 as shown in FIG. 6C), the second operating pattern being one of the at least one operating pattern other than the first operating pattern.

Optionally, the first condition may be determined based on at least one of (501) to (511) below.

(501) Pattern switching indication sent by the network-side device

For example, if the repeater is in the ON state and the network device indicates pattern switching, the repeater switches from the ON state to the OFF state; or if the repeater is in the OFF state and the network device indicates pattern switching, the repeater switches from the OFF state to the ON state.

If the repeater is in the ON state and the network device indicates no switching, the repeater maintains the ON state; or if the repeater is in the OFF state and the network device indicates no switching, the repeater maintains the OFF state.

(502) Operating time for the first operating pattern

For example, if a time length that the repeater is in the ON state is greater than a first preset value, the repeater switches to the ON state; or if the time length that the repeater is in the OFF state is greater than a second preset value, the repeater switches to the OFF state.

(503) Data scheduling information

For example, if the terminal or repeater is configured or indicated for uplink transmission or downlink transmission in the target time unit, the repeater is in the ON state in the target time unit; if the terminal or repeater is configured or indicated for no scheduling transmission in the target time unit, the repeater is in the OFF state in the target time unit.

(504) TDD configuration information

For example, if the TDD configuration information indicates that the target time unit is an UL time unit or a DL time unit, the repeater is in the ON state; or if the TDD configuration information indicates that the target time unit is a flexible time unit, the repeater is in the OFF state.

(505) Beam information

For example, if the repeater is in the ON state and the network side indicates that a beam direction and/or transmit power in the target time unit does not meet a requirement of uplink transmission or downlink transmission, the repeater switches from the ON state to the OFF state.

(506) Beam ID or beam index

For example, if the repeater is in the ON state and the network side indicates that a beam ID or beam index in the target time unit does not meet a requirement of uplink transmission or downlink transmission, the repeater switches from the ON state to the OFF state.

(507) Transmit power of the repeater

For example, if the repeater is in the ON state and the transmit power does not meet a requirement of uplink transmission or downlink transmission, the repeater switches from the ON state to the OFF state; or if the repeater is in the OFF state and the transmit power meets a requirement of uplink transmission or downlink transmission, the repeater switches from the OFF state to the ON state.

(508) DRX configuration information

For example, the repeater switches between the ON state and the OFF state based on the DRX configuration information. If the target time unit corresponding to the DRX configuration is ON, the repeater is in the ON state; or if the target time unit corresponding to the DRX configuration is OFF, the repeater is in the OFF state.

(509) Terminal identification information

For example, if the terminal is identified as access UE of the repeater, the repeater is in the ON state in the target time unit; otherwise, the repeater is in the OFF state.

(510) Load information

For example, the repeater changes a ratio of ON state resources to OFF state resources of the repeater based on a load size. If the load is relatively large, the ratio of ON state resources to OFF state resources is relatively large; or if the load is relatively small, the ratio of ON state resources to OFF state resources is reduced;

(511) Target resource information, where the target resource information includes at least one of hard resource information, soft resource information, or unavailable resource information.

For example, if the target time unit is configured with a hard resource, the repeater is in the ON state in the target time unit; or if the target time unit is configured with a soft resource, the repeater is in the OFF state in the target time unit.

Similar to the foregoing state configuration information, the at least one operating pattern may alternatively be configured based on a predetermined dimension, and the predetermined dimension includes at least one of the following (601) to (608).

(601) UL dimension;

(602) DL dimension;

(603) time unit dimension;

(604) time division multiplexing TDM dimension;

(605) frequency division multiplexing FDM dimension;

(606) space division multiplexing SDM dimension;

(607) frequency domain dimension, where the frequency domain dimension includes at least one frequency domain subdimension; or (608) time domain dimension, where the time domain dimension includes at least one time domain subdimension.

It can be understood that for the related descriptions about the foregoing (601) to (608), reference may be made to the foregoing descriptions about the state configuration information, and details are not repeated herein to avoid repetition.

In this embodiment, configuring the operating pattern and the state configuration information according to different predetermined dimensions can reduce interference and ensure wireless communication performance.

For example, if the inter-cell resources are divided based on TDM, the repeater is set based on the operating pattern to amplify only time domain resources managed by the donor, so as to avoid interference caused to neighboring cells. In addition, On/Off is additionally introduced, and even if a terminal interfered by the repeater is present under the coverage of the donor, the terminal can be scheduled by the donor when the repeater is in the off state.

Figure 7:
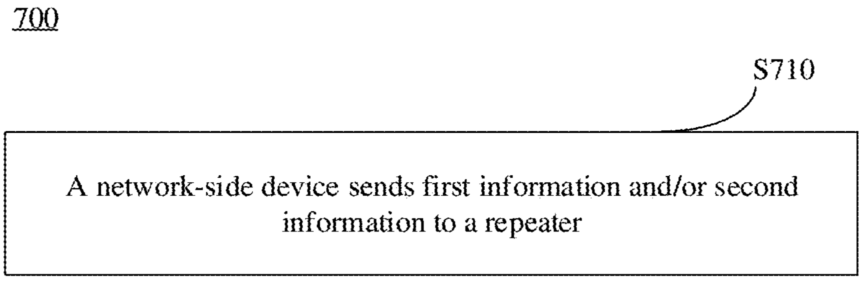
FIG. 7 is a schematic flowchart of a repeater control method according to another example embodiment of this application.

FIG. 7 is a schematic flowchart of a repeater control method 700 according to an example embodiment of this application. The method 700 may be, but is not limited to, performed by a network-side device, and may be performed by hardware and/or software installed in the network-side device. In this embodiment, the method 700 may include at least the following steps.

S710: The network-side device sends first information and/or second information to a repeater.

The first information is used to indicate the repeater to determine a target state, the target state includes a first state or a second state, the first state indicates that the repeater amplifies and/or forwards an input signal, and the second state indicates that the repeater does not amplify and/or forward an input signal; and the second information is used to indicate a terminal access status to the repeater.

In a possible implementation, the first information includes at least one of the following: first indication information, used to indicate that the repeater is to perform state switching or is not to perform state switching; second indication information, used to indicate that the repeater is in the first state or the second state; data scheduling information; TDD configuration information; beam information; beam identifier or beam index; transmit power of the repeater; DRX configuration information; terminal identification information; load information; target resource information, where the target resource information includes at least one of hard resource information, soft resource information, or unavailable resource information; MCG configuration information; or secondary cell group SCG configuration information.

In another possible implementation, the second information includes at least one of the following: fourth indication information, used to indicate presence or absence of terminal access to the repeater; SSB configuration information; paging configuration information; CORESET configuration information; search space configuration information; or data scheduling information.

In another possible implementation, the terminal access status is determined by the network-side device based on any one of a second measurement result, a third measurement result, a fourth measurement result, and a fifth measurement result; where the second measurement result is a measurement result obtained through measurement performed by a terminal on first downlink measurement information sent by the network-side device, and the first downlink measurement information is information sent by the network-side device to the terminal in a case that the repeater is in the second state; the third measurement result is a measurement result obtained through measurement performed by the network-side device on first uplink measurement information sent by the terminal, and the first uplink measurement information is information sent by the terminal to the network-side device in the case that the repeater is in the second state; the fourth measurement result is a measurement result obtained through measurement performed by the terminal on second downlink measurement information sent by the network-side device, and the second downlink measurement information is information sent by the network-side device to the terminal in a case that the repeater is in the first state; and the fifth measurement result is a measurement result obtained through measurement performed by the network-side device on second uplink measurement information sent by the terminal, and the second uplink measurement information is information sent by the terminal to the network-side device in the case that the repeater is in the first state.

In another possible implementation, before the network-side device sends the second information to the repeater, the method further includes: the network-side device sends fifth indication information to the repeater, where the fifth indication information carries at least switching command for indicating the repeater to switch to the first state or the second state, and related time information for switching to the first state or the second state by the repeater.

In another possible implementation, the related time information carries at least one of the following: transmission time information for the first downlink measurement information; transmission time information for the first uplink measurement information; transmission time information for the second downlink measurement information; or transmission time information for the second uplink measurement information.

It can be understood that for the implementation processes of the implementations provided in this embodiment, reference may be made to descriptions in the foregoing method embodiments 200 to 600, with the same technical effect achieved. To avoid repetition, details are not repeated herein.

In this embodiment, the network-side device indicates the first information and/or the second information to the repeater, so that the repeater can determine the target state based on the first information and then perform state switching based on the target state. In this way, the repeater is able to switch between the first state and the second state when signal forwarding or amplification is not required. This implements both power saving and reduces interference caused by noise amplification in the wireless communication system, ensuring quality of wireless communication.

It should be noted that, for the repeater control methods 200 to 700 provided by the embodiments of this application, the execution body may be a repeater control apparatus, or a control module for executing the repeater control method in the repeater control apparatus. In the embodiments of this application, the repeater control apparatus provided in the embodiments of this application is described by using the repeater control method being executed by the repeater control apparatus as an example.

Figure 8:
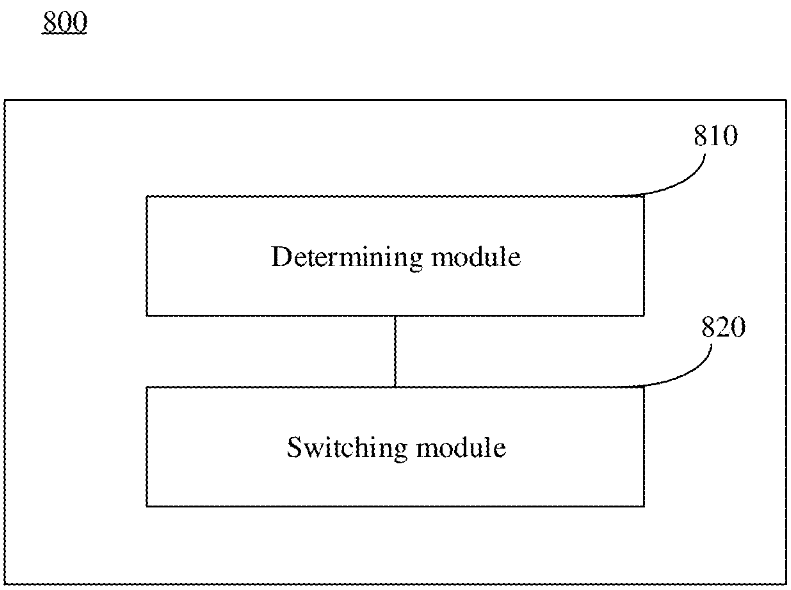
FIG. 8 is a schematic structural diagram of a repeater control apparatus according to an example embodiment of this application.

FIG. 8 is a schematic structural diagram of a repeater control apparatus 800 according to an example embodiment of this application. The apparatus 800 includes: a determining module 810, configured to determine a target state based on a terminal access status and/or first information indicated by a network-side device; and a switching module 820, configured to perform state switching based on the target state; where the target state includes a first state or a second state, the first state indicates that the repeater amplifies and/or forwards an input signal, and the second state indicates that the repeater does not amplify and/or forward an input signal.

In a possible implementation, the first information includes at least one of the following: first indication information, used to indicate that the repeater is to perform state switching or is not to perform state switching; second indication information, used to indicate that the repeater is in the first state or the second state; data scheduling information; time division duplex TDD configuration information; beam information; beam identifier ID or beam index; transmit power of the repeater; discontinuous reception DRX configuration information; terminal identification information; load information; target resource information, where the target resource information includes at least one of hard resource information, soft resource information, or unavailable resource information; MCG configuration information; or SCG configuration information.

In another possible implementation, the determining module 810 is configured to perform at least one of the following: in a case that scheduling data indicated by the data scheduling information is uplink UL data and/or downlink DL data, determining that the target state is the first state; in a case that the data scheduling information schedules no UL data or DL data, determining that the target state is the second state; or in a case that the scheduling data indicated by the data scheduling information is predetermined data, determining that the target state is the first state; where the predetermined data includes at least one of physical random access channel PRACH, physical uplink control channel PUCCH, sounding reference signal SRS, channel state information-reference signal CSI-RS, synchronization signal block SSB, or common search space CSS.

In another possible implementation, the determining module 810 is configured to perform at least one of the following: in a case that the TDD configuration includes an UL configuration and/or a DL configuration, determining that the target state is the first state; in a case that the TDD configuration includes a flexible configuration, determining that the target state is the second state; or determining the target state based on a ratio of the TDD configurations, where the ratio of configurations is a ratio between a first configuration and a second configuration, the first configuration includes an UL configuration and/or a DL configuration, and the second configuration includes a flexible configuration.

In another possible implementation, the determining module 810 is configured to perform at least one of the following: in a case that the target resource information is the hard resource, determining that the target state is the first state; in a case that the target resource information is the unavailable resource, determining that the target state is the second state; or in a case that the target resource information is the soft resource, determining that the target state is the second state or the first state.

In another possible implementation, the determining module 810 is configured to perform at least one of the following: in a case that the target resource information is the soft resource and third indication information sent by the network-side device is received, determining the target state based on the third indication information, where the third indication information is used to indicate that the repeater is in the first state or the second state; or in a case that the target resource information is the soft resource, determining by default that the target state is the second state.

In another possible implementation, the determining module 810 is configured to perform at least one of the following: in a case that both the MCG configuration information and the SCG configuration information indicate a state of the repeater being the second state, determining that the target state is the second state; or in a case that the MCG configuration information or the SCG configuration information indicates a state of the repeater being the first state, determining that the target state is the first state.

In another possible implementation, in a case that the MCG configuration information indicates an operating time range of the repeater being a first time range and the SCG configuration information indicates the operating time range of the repeater being a second time range, the operating time range of the repeater is a sum of the first time range and the second time range; in a case that the MCG configuration information indicates an operating time range of the repeater being a first time range and the SCG configuration information indicates the operating time range of the repeater being a second time range, the operating time range of the repeater is an overlapping portion between the first time range and the second time range; in a case that the MCG configuration information indicates an operating frequency range of the repeater being a first frequency range and the SCG configuration information indicates the operating frequency range of the repeater being a second frequency range, the operating frequency range of the repeater is a sum of the first frequency range and the second frequency range; in a case that the MCG configuration information indicates an operating frequency range of the repeater being a first frequency range and the SCG configuration information indicates the operating frequency range of the repeater being a second frequency range, the operating frequency range of the repeater is an overlapping portion between the first frequency range and the second frequency range; and in a case that the MCG configuration information indicates the operating time range of the repeater being a first time range and the operating frequency range being a first frequency range, and that the SCG configuration information indicates the operating time range of the repeater being a second time range and the operating frequency range being a second frequency range, the operating time range of the repeater is an overlapping portion between the first time range and the second time range portion, and the operating frequency range of the repeater is a sum of the first frequency range and the second frequency range.

In another possible implementation, the determining module 810 is configured to perform at least one of the following: in a case that the terminal access status is presence of terminal access to the repeater, determining that the target state is the first state; or in a case that the terminal access status is no terminal access to the repeater, determining that the target state is the second state.

In another possible implementation, the determining module 810 is further configured to perform at least one of the following: determining, by the repeater, the terminal access status based on second information indicated by the network-side device; or determining, by the repeater, the terminal access status based on a first measurement result for third information.

In another possible implementation, the second information includes at least one of the following: fourth indication information, used to indicate presence or absence of terminal access to the repeater; SSB configuration information; paging configuration information; control resource set CORESET configuration information; search space configuration information; or data scheduling information.

In another possible implementation, the second information is determined by the network-side device based on any one of a second measurement result, a third measurement result, a fourth measurement result, and a fifth measurement result; where the second measurement result is a measurement result obtained through measurement performed by a terminal on first downlink measurement information sent by the network-side device, and the first downlink measurement information is information sent by the network-side device to the terminal in a case that the repeater is in the second state; the third measurement result is a measurement result obtained through measurement performed by the network-side device on first uplink measurement information sent by the terminal, and the first uplink measurement information is information sent by the terminal to the network-side device in the case that the repeater is in the second state; the fourth measurement result is a measurement result obtained through measurement performed by the terminal on second downlink measurement information sent by the network-side device, and the second downlink measurement information is information sent by the network-side device to the terminal in a case that the repeater is in the first state; and the fifth measurement result is a measurement result obtained through measurement performed by the network-side device on second uplink measurement information sent by the terminal, and the second uplink measurement information is information sent by the terminal to the network-side device in the case that the repeater is in the first state.

In another possible implementation, the apparatus 800 further includes: a first transceiver module configured to receive fifth indication information sent by the network-side device, where the fifth indication information carries at least a switching command and/or related time information, the switching command is used to instruct the repeater to switch to the first state or the second state, and the related time information is information about a time for switching to the first state or the second state by the repeater. The switching module 820 is further configured to perform state switching according to the switching command and/or the related time information.

In another possible implementation, the related time information includes at least one of the following: transmission time information for the first downlink measurement information; transmission time information for the first uplink measurement information; transmission time information for the second downlink measurement information; or transmission time information for the second uplink measurement information.

In another possible implementation, the determining module 810 is configured to perform at least one of the following: in a case that the first measurement result is no uplink signal being detected, determining that the terminal access status is no terminal access to the repeater; in a case that the first measurement result is less than a first threshold, determining that the terminal access status is no terminal access to the repeater; in a case that the first measurement result is not less than a first threshold, determining that the terminal access status is presence of terminal access to the repeater; or in a case that the first measurement result is an uplink signal being detected, determining that the terminal access status is presence of terminal access to the repeater.

In another possible implementation, the first transceiver module is further configured to receive sixth indication information sent by the network-side device, where the sixth indication information carries measurement time activation information and/or measurement time indication information; and the determining module 810 is further configured to determine a target measurement time based on the measurement time activation information and/or the measurement time indication information, and perform measurement on the third information based on the target measurement time to obtain the first measurement result.

In another possible implementation, the switching module 820 is further configured to switch to the first state in a case that the sixth indication information carries the measurement time activation information and the repeater is in the second state.

In another possible implementation, the switching module 820 is further configured to switch from the second state to the first state in a case that the repeater is in the second state but needs to forward and/or perform amplification processing on a signal sent by a target device; where the target device is a terminal and/or a network-side device under a coverage of the repeater.

In another possible implementation, the first transceiver module is further configured to receive fourth information sent by the network-side device; and the determining module 810 is further configured to determine, based on the fourth information, whether to forward and/or perform amplification processing on the signal sent by the target device.

In another possible implementation, the determining module 810 is further configured to: in a case that at least one piece of state configuration information is configured in the repeater, determine target configuration information based on the at least one piece of state configuration information, where a state determining rule for the repeater is configured in the state configuration information; and the determining module 810 is further configured to: determine the target state based on the target configuration information according to the terminal access status and/or the first information indicated by the network-side device.

In another possible implementation, the switching module 820 is further configured to: in a case that the repeater switches to the first state, performing, by the repeater, signal amplification based on a first operating pattern; where at least one operating pattern is configured for the repeater, at least one amplification factor of the repeater is configured for each of the operating patterns, different amplification factors correspond to different time-domain information and/or frequency-domain information, and the first operating pattern belongs to the at least one operating pattern.

In another possible implementation, the switching module 820 is further configured to: in a case that a first condition is met, switch from the first operating pattern to a second operating pattern, where the second operating pattern is an operating pattern other than the first operating pattern in the at least one operating pattern.

In another possible implementation, the first condition is determined based on at least one of the following: a pattern switching indication sent by the network-side device; an operating time for the first operating pattern; data scheduling information; TDD configuration information; beam information; beam ID or beam index; transmit power of the repeater; DRX configuration information; terminal identification information; load information; or target resource information, where the target resource information includes at least one of hard resource information, soft resource information, or unavailable resource information.

In another possible implementation, the at least one piece of state configuration information and/or the at least one operating pattern is configured based on a predetermined dimension, and the predetermined dimension includes at least one of the following: UL dimension; DL dimension; time unit dimension; time division multiplexing TDM dimension; frequency division multiplexing FDM dimension; space division multiplexing SDM dimension; frequency domain dimension, where the frequency domain dimension includes at least one frequency domain subdimension; or time domain dimension, where the time domain dimension includes at least one time domain subdimension.

In another possible implementation, the first information or the second information is transmitted via fifth information, and the fifth information includes at least one of radio resource control RRC configuration information, media access control control element MAC CE, or DCI.

In another possible implementation, in a case that the first information is transmitted via the fifth information, the fifth information further carries at least one of a start time, an end time, or duration of the target state of the repeater.

In another possible implementation, a validity time of the fifth information is determined based on a first value and a first time unit in which the fifth information is received; or the validity time of the fifth information is determined based on seventh indication information sent by the network-side device.

In another possible implementation, the first value is related to a subcarrier spacing.

In this embodiment of this application, the target state is determined based on the terminal state information and the first information indicated by the network-side device, and then state switching is performed based on the target state. In this way, the repeater is able to switch between the first state and the second state when signal forwarding or amplification is not required. This implements both power saving and reduces interference caused by noise amplification in the wireless communication system, ensuring quality of wireless communication.

Figure 9:
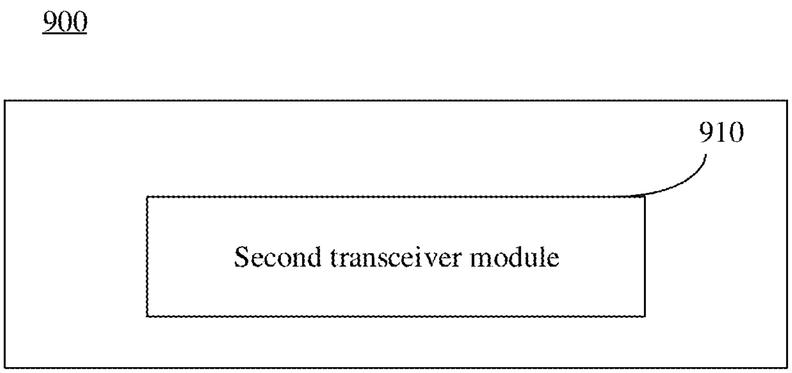
FIG. 9 is a schematic structural diagram of a repeater control apparatus according to another example embodiment of this application.

FIG. 9 is a schematic structural diagram of a repeater control apparatus 900 according to an example embodiment of this application. The apparatus 900 includes: a second transceiver module 910, configured to send first information and/or second information to a repeater; where the first information is used to indicate the repeater to determine a target state, the target state includes a first state or a second state, the first state indicates that the repeater amplifies and/or forwards an input signal, and the second state indicates that the repeater does not amplify and/or forward an input signal; and the second information is used to indicate a terminal access status to the repeater.

In a possible implementation, the apparatus 900 may further include: a configuration module, where the configuration module is configured to configure the first information and/or second information.

In a possible implementation, the first information includes at least one of the following: first indication information, used to indicate that the repeater is to perform state switching or is not to perform state switching; second indication information, used to indicate that the repeater is in the first state or the second state; data scheduling information; time division duplex TDD configuration information; beam information; beam identifier ID or beam index; transmit power of the repeater; discontinuous reception DRX configuration information; terminal identification information; load information; target resource information, where the target resource information includes at least one of hard resource information, soft resource information, or unavailable resource information; master cell group MCG configuration information; or secondary cell group SCG configuration information.

In another possible implementation, the second information includes at least one of the following: fourth indication information, used to indicate presence or absence of terminal access to the repeater; SSB configuration information; paging configuration information; CORESET configuration information; search space configuration information; or data scheduling information.

In another possible implementation, the terminal access status is determined based on any one of a second measurement result, a third measurement result, a fourth measurement result, and a fifth measurement result; where the second measurement result is a measurement result obtained through measurement performed by a terminal on first downlink measurement information sent by the network-side device, and the first downlink measurement information is information sent by the network-side device to the terminal in a case that the repeater is in the second state; the third measurement result is a measurement result obtained through measurement performed by the network-side device on first uplink measurement information sent by the terminal, and the first uplink measurement information is information sent by the terminal to the network-side device in the case that the repeater is in the second state; the fourth measurement result is a measurement result obtained through measurement performed by the terminal on second downlink measurement information sent by the network-side device, and the second downlink measurement information is information sent by the network-side device to the terminal in a case that the repeater is in the first state; and the fifth measurement result is a measurement result obtained through measurement performed by the network-side device on second uplink measurement information sent by the terminal, and the second uplink measurement information is information sent by the terminal to the network-side device in the case that the repeater is in the first state.

In another possible implementation, the second transceiver module 910 is further configured to send fifth indication information to the repeater, where the fifth indication information carries at least switching command for indicating the repeater to switch to the first state or the second state, and related time information for switching to the first state or the second state by the repeater.

In another possible implementation, the related time information carries at least one of the following: transmission time information for the first downlink measurement information; transmission time information for the first uplink measurement information; transmission time information for the second downlink measurement information; or transmission time information for the second uplink measurement information.

In this embodiment, the first information and/or the second information is indicated to the repeater, so that the repeater can determine the target state based on the first information and then perform state switching based on the target state. In this way, the repeater is able to switch between the first state and the second state when signal forwarding or amplification is not required. This implements both power saving and reduces interference caused by noise amplification in the wireless communication system, ensuring quality of wireless communication.

The repeater control apparatus 800 or 900 in this embodiment of this application may be an apparatus, or an apparatus or electric device having an operating system, or may be a component, an integrated circuit, or a chip in the repeater.

The repeater control apparatus 800 or 900 provided in this embodiment of this application is capable of implementing the processes implemented in the method embodiments in FIG. 2 to FIG. 7, with the same technical effects achieved. To avoid repetition, details are not described herein again.

An embodiment of this application further provides a repeater, including a processor and a communication interface, where the communication interface is coupled to the processor, and the processor is configured to run a program or instructions to implement the processes of the method embodiments 200 to 600. The repeater embodiments correspond to the foregoing repeater-side method embodiments, and the implementation processes and implementations of the foregoing method embodiments can be applied to the repeater embodiments, with the same technical effects achieved.

Figure 10:
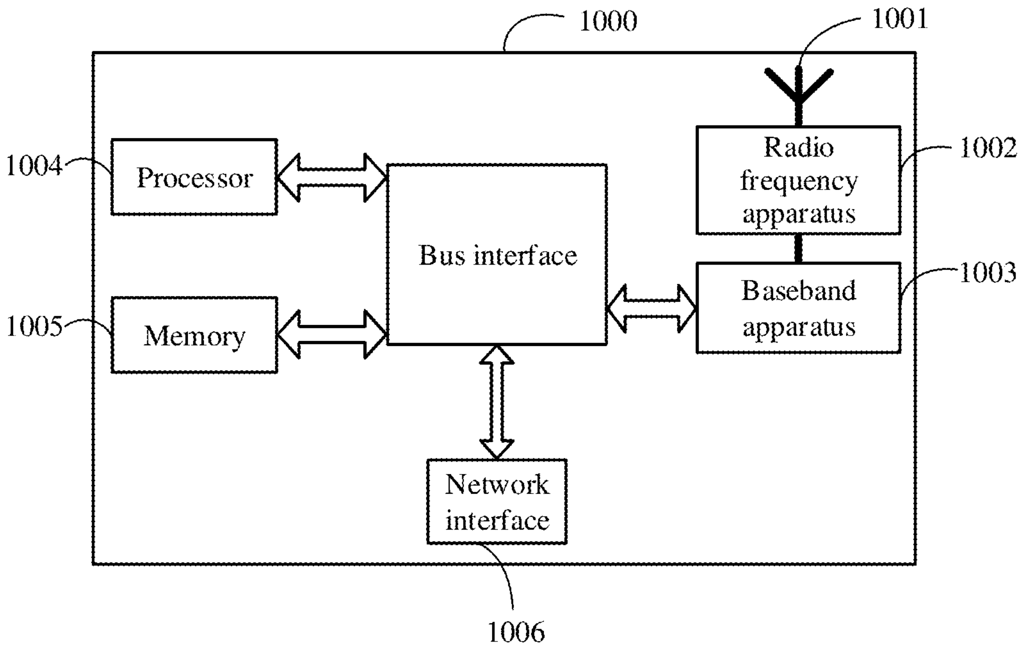
FIG. 10 is a schematic structural diagram of a repeater according to an example embodiment of this application.

For example, an embodiment of this application further provides a repeater. As shown in FIG. 10, the repeater 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and sends the received information to the baseband apparatus 1003 for processing. In a downlink direction, the baseband apparatus 1003 processes to-be-sent information, and sends the information to the radio frequency apparatus 1002; and the radio frequency apparatus 1002 processes the received information and then sends the information out by using the antenna 1001.

The frequency band processing apparatus may be located in the baseband apparatus 1003. The method performed by the repeater in the foregoing embodiment may be implemented in the baseband apparatus 1003, and the baseband apparatus 1003 includes a processor 1004 and a memory 1005.

The baseband apparatus 1003 may include, for example, at least one baseband board, where a plurality of chips are disposed on the baseband board. As shown in FIG. 10, one of the chips, for example, the processor 1004, is connected to the memory 1005, to invoke a program in the memory 1005 to perform the operation of the network device shown in the foregoing method embodiments.

The baseband apparatus 1003 may further include a network interface 1006, configured to exchange information with the radio frequency apparatus 1002, where the interface is, for example, a common public radio interface (CPRI).

For example, the repeater in this embodiment of the present application further includes: an instruction or a program stored in the memory 1005 and executable on the processor 1004. The processor 1004 invokes the instruction or program in the memory 1005 to execute the method executed by the modules shown in FIG. 8, with the same technical effects achieved. To avoid repetition, details are not repeated herein.

An embodiment of this application further provides a network-side device, including a processor and a communication interface, where the communication interface is coupled to the processor, and the processor is configured to run a program or instructions to implement the processes of the method embodiments 700. The network-side device embodiments correspond to the foregoing network-side device-side method embodiments, and the implementation processes and implementations of the foregoing method embodiments can be applied to the network-side device embodiments, with the same technical effects achieved.

Figure 11:
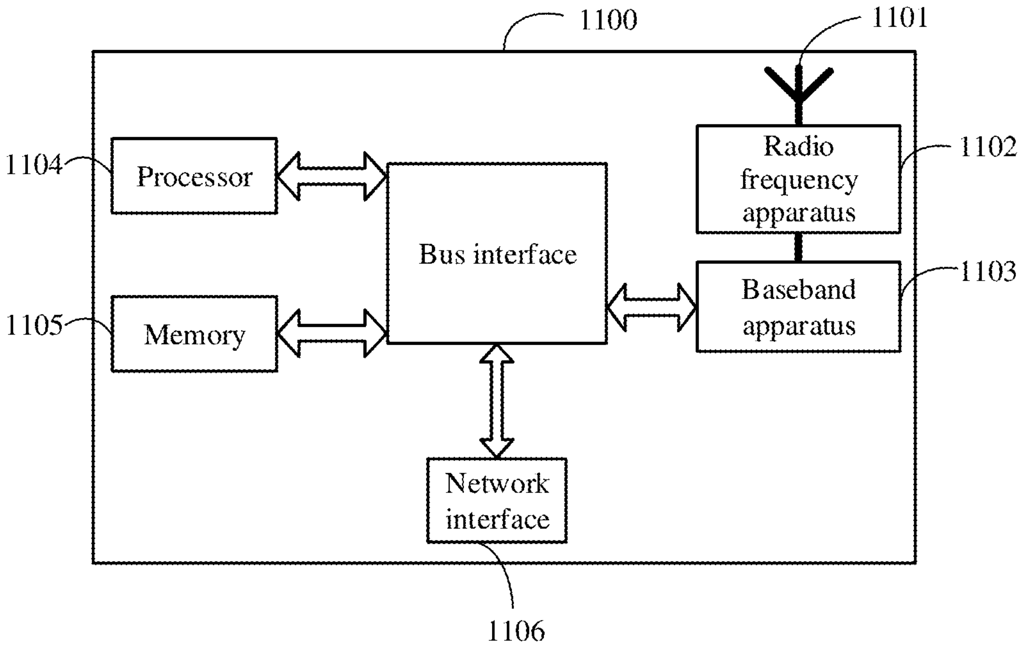
FIG. 11 is a schematic structural diagram of a network-side device according to an example embodiment of this application.

For example, an embodiment of this application further provides a network-side device. As shown in FIG. 11, the network device 1100 includes an antenna 1101, a radio frequency apparatus 1102, and a baseband apparatus 1103. The antenna 1101 is connected to the radio frequency apparatus 1102. In an uplink direction, the radio frequency apparatus 1102 receives information by using the antenna 1101, and sends the received information to the baseband apparatus 1103 for processing. In a downlink direction, the baseband apparatus 1103 processes to-be-sent information, and sends the information to the radio frequency apparatus 1102; and the radio frequency apparatus 1102 processes the received information and then sends the information out by using the antenna 1101.

The frequency band processing apparatus may be located in the baseband apparatus 1103. The method performed by the network-side device in the foregoing embodiments may be implemented in the baseband apparatus 1103, and the baseband apparatus 1103 includes a processor 1104 and a memory 1105.

The baseband apparatus 1103 may include, for example, at least one baseband board, where a plurality of chips are disposed on the baseband board. As shown in FIG. 11, one of the chips, for example, the processor 1104, is connected to the memory 1105, to invoke a program in the memory 1105 to perform the operation of the network device shown in the foregoing method embodiments.

The baseband apparatus 1103 may further include a network interface 1106, configured to exchange information with the radio frequency apparatus 1102, where the interface is, for example, a common public radio interface (CPRI).

For example, the network-side device in this embodiment of the present application further includes: instructions or a program stored in the memory 1105 and executable on the processor 1104. The processor 1104 invokes the instructions or program in the memory 1105 to execute the method executed by the modules shown in FIG. 9, with the same technical effects achieved. To avoid repetition, details are not repeated herein.

An embodiment of this application further provides a non-transitory readable storage medium, where a program or an instruction is stored in the non-transitory readable storage medium. When the program or the instruction is executed by a processor, the processes of the forgoing repeater control method embodiments are implemented, with the same technical effects achieved. To avoid repetition, details are not described herein again.

The processor is a processor in the repeater described in the foregoing embodiments. The non-transitory readable storage medium includes a non-transitory computer readable storage medium, such as computer read-only memory (ROM).

An embodiment of this application further provides a chip, where the chip includes a processor and a communication interface. The communication interface is coupled to the processor, and the processor is configured to run a program or instructions of a network-side device to implement the processes of the foregoing repeater control method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program product, where the computer program product includes a processor, a memory, and a program or instructions stored in the memory and executable on the processor, and when the program or the instructions are executed by the processor, the processes of the foregoing repeater control method embodiments are implemented, with the same technical effects achieved. To avoid repetition, details are not described herein again.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing implementations. These implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A repeater control method, comprising:

determining, by a repeater, a target state based on first information indicated by a network-side device; and performing, by the repeater, state switching based on the target state; wherein the target state comprises a first state or a second state, the first state indicates that the repeater amplifies and/or forwards an input signal, and the second state indicates that the repeater does not amplify and/or forward an input signal;

the first information comprises at least one of master cell group (MCG) configuration information, or secondary cell group (SCG) configuration information;

wherein that the repeater determines the target state based on the MCG configuration information and/or the SCG configuration information indicated by the network-side device comprises at least one of the following:

when both the MCG configuration information and the SCG configuration information indicate a state of the repeater being the second state, determining that the target state is the second state; or when the MCG configuration information or the SCG configuration information indicates the state of the repeater being the first state, determining that the target state is the first state.

2. The method according to claim 1, wherein the first information further comprises at least one of the following:

first indication information, used to indicate that the repeater is to perform state switching or is not to perform state switching;

second indication information, used to indicate that the repeater is in the first state or the second state;

data scheduling information;

time division duplex (TDD) configuration information;

beam information;

beam identifier (ID) or beam index;

transmit power of the repeater;

discontinuous reception (DRX) configuration information;

terminal identification information;

load information; or target resource information, wherein the target resource information comprises at least one of hard resource information, soft resource information, or unavailable resource information.

3. The method according to claim 2, wherein that the repeater determines the target state based on the data scheduling information indicated by the network-side device comprises at least one of the following:

when scheduling data indicated by the data scheduling information is uplink (UL) data and/or downlink (DL) data, determining that the target state is the first state;

when the data scheduling information schedules no UL data or DL data, determining that the target state is the second state; or when the scheduling data indicated by the data scheduling information is predetermined data, determining that the target state is the first state; wherein the predetermined data comprises at least one of physical random access channel (PRACH), physical uplink control channel (PUCCH), sounding reference signal (SRS), channel state information-reference signal (CSI-RS), synchronization signal block (SSB), or common search space (CSS).

4. The method according to claim 2, wherein that the repeater determines the target state based on the target resource information indicated by the network-side device comprises at least one of the following:

when the target resource information is the hard resource, determining that the target state is the first state;

when the target resource information is the unavailable resource, determining that the target state is the second state; or when the target resource information is the soft resource, determining that the target state is the second state or the first state.

5. The method according to claim 4, wherein the determining that the target state is the second state or the first state when the target resource information is the soft resource comprises any one of the following:

when the target resource information is the soft resource and third indication information sent by the network-side device is received, determining the target state based on the third indication information, wherein the third indication information is used to indicate that the repeater is in the first state or the second state; and when the target resource information is the soft resource, determining by default that the target state is the second state.

6. The method according to claim 2, wherein when the MCG configuration information indicates an operating time range of the repeater being a first time range and the SCG configuration information indicates the operating time range of the repeater being a second time range, the operating time range of the repeater is a sum of the first time range and the second time range;

when the MCG configuration information indicates the operating time range of the repeater being the first time range and the SCG configuration information indicates the operating time range of the repeater being the second time range, the operating time range of the repeater is an overlapping portion between the first time range and the second time range;

when the MCG configuration information indicates an operating frequency range of the repeater being a first frequency range and the SCG configuration information indicates the operating frequency range of the repeater being a second frequency range, the operating frequency range of the repeater is a sum of the first frequency range and the second frequency range;

when the MCG configuration information indicates the operating frequency range of the repeater being the first frequency range and the SCG configuration information indicates the operating frequency range of the repeater being the second frequency range, the operating frequency range of the repeater is an overlapping portion between the first frequency range and the second frequency range; and when the MCG configuration information indicates the operating time range of the repeater being the first time range and the operating frequency range being the first frequency range, and that the SCG configuration information indicates the operating time range of the repeater being the second time range and the operating frequency range being the second frequency range, the operating time range of the repeater is the overlapping portion between the first time range and the second time range portion, and the operating frequency range of the repeater is the sum of the first frequency range and the second frequency range.

7. The method according to claim 1, wherein the method further comprises:

switching, by the repeater, from the second state to the first state when the repeater is in the second state but needs to forward and/or perform amplification processing on a signal sent by a target device; wherein the target device is a terminal and/or a network-side device under a coverage of the repeater.

8. The method according to claim 1, wherein before the determining, by a repeater, a target state based on a terminal access status and/or first information indicated by a network-side device, the method further comprises:

when at least one piece of state configuration information is configured in the repeater, determining target configuration information based on the at least one piece of state configuration information, wherein a state determining rule for the repeater is configured in the state configuration information; and the determining, by a repeater, a target state based on a terminal access status and/or first information indicated by a network-side device comprises:

determining, by the repeater, the target state based on the target configuration information according to the terminal access status and/or the first information indicated by the network-side device.

9. The method according to claim 1, wherein after the performing, by the repeater, state switching based on the target state, the method further comprises:

when the repeater switches to the first state, performing, by the repeater, signal amplification based on a first operating pattern; wherein at least one operating pattern is configured for the repeater, at least one amplification factor of the repeater is configured for each operating pattern, different amplification factors correspond to different time-domain information and/or frequency-domain information, and the first operating pattern belongs to the at least one operating pattern; and when a first condition is met, switching, by the repeater, from the first operating pattern to a second operating pattern, wherein the second operating pattern is an operating pattern other than the first operating pattern in the at least one operating pattern; and the first condition is determined based on at least one of the following:

a pattern switching indication sent by the network-side device;

an operating time for the first operating pattern;

data scheduling information;

time division duplex (TDD) configuration information;

beam information;

beam identifier (ID) or beam index;

transmit power of the repeater;

discontinuous reception (DRX) configuration information;

terminal identification information;

load information; or target resource information, wherein the target resource information comprises at least one of hard resource information, soft resource information, or unavailable resource information.

10. The method according to claim 8, wherein the at least one piece of state configuration information and/or the at least one operating pattern is configured based on a predetermined dimension, and the predetermined dimension comprises at least one of the following:

uplink (UL) dimension;

downlink (DL) dimension;

time unit dimension;

time division multiplexing (TDM) dimension;

frequency division multiplexing (FDM) dimension;

space division multiplexing (SDM) dimension;

frequency domain dimension, wherein the frequency domain dimension comprises at least one frequency domain subdimension; or time domain dimension, wherein the time domain dimension comprises at least one time domain subdimension.

11. The method according to claim 1, wherein the first information or the second information is transmitted via fifth information, and the fifth information comprises at least one of radio resource control (RRC), configuration information, media access control control element (MAC CE), and downlink control information (DCI).

12. The method according to claim 2, wherein that the repeater determines the target state based on the TDD configuration information indicated by the network-side device comprises at least one of the following:

in a case that the TDD configuration comprises an uplink (UL) configuration and/or a downlink (DL) configuration, determining that the target state is the first state;

in a case that the TDD configuration comprises a flexible configuration, determining that the target state is the second state; or determining the target state based on a ratio of the TDD configurations, wherein the ratio of the TDD configurations is a ratio between a first configuration and a second configuration, the first configuration comprises an UL configuration and/or a DL configuration, and the second configuration comprises a flexible configuration.

13. A repeater, comprising a processor, a memory, and a program or instructions stored in the memory and executable on the processor, wherein the program or the instructions, when executed by the processor, cause the repeater to perform:

determining a target state based on first information indicated by a network-side device; and performing state switching based on the target state; wherein the target state comprises a first state or a second state, the first state indicates that the repeater amplifies and/or forwards an input signal, and the second state indicates that the repeater does not amplify and/or forward an input signal; wherein the first information comprises at least one of master cell group (MCG) configuration information, or secondary cell group (SCG) configuration information;

the program or the instructions, when executed by the processor, cause the repeater to perform at least one of the following steps:

when both the MCG configuration information and the SCG configuration information indicate a state of the repeater being the second state, determining that the target state is the second state; or when the MCG configuration information or the SCG configuration information indicates the state of the repeater being the first state, determining that the target state is the first state.

14. The repeater according to claim 13, wherein the first information further comprises at least one of the following:

first indication information, used to indicate that the repeater is to perform state switching or is not to perform state switching;

second indication information, used to indicate that the repeater is in the first state or the second state;

data scheduling information;

time division duplex (TDD) configuration information;

beam information;

beam identifier (ID) or beam index;

transmit power of the repeater;

discontinuous reception (DRX) configuration information;

terminal identification information;

load information; or target resource information, wherein the target resource information comprises at least one of hard resource information, soft resource information, or unavailable resource information.

15. The repeater according to claim 14, wherein the program or the instructions, when executed by the processor, cause the repeater to perform at least one of the following steps:

when scheduling data indicated by the data scheduling information is uplink (UL) data and/or downlink (DL) data, determining that the target state is the first state;

when the data scheduling information schedules no UL data or DL data, determining that the target state is the second state; or when the scheduling data indicated by the data scheduling information is predetermined data, determining that the target state is the first state; wherein the predetermined data comprises at least one of physical random access channel (PRACH), physical uplink control channel (PUCCH), sounding reference signal (SRS), channel state information-reference signal (CSI-RS), synchronization signal block (SSB), or common search space (CSS).

16. The repeater according to claim 14, wherein the program or the instructions, when executed by the processor, cause the repeater to perform at least one of the following steps:

when the target resource information is the hard resource, determining that the target state is the first state;

when the target resource information is the unavailable resource, determining that the target state is the second state; or when the target resource information is the soft resource, determining that the target state is the second state or the first state.

17. The repeater according to claim 16, wherein the program or the instructions, when executed by the processor, cause the repeater to perform any one of the following steps:

when the target resource information is the soft resource and third indication information sent by the network-side device is received, determining the target state based on the third indication information, wherein the third indication information is used to indicate that the repeater is in the first state or the second state; and when the target resource information is the soft resource, determining by default that the target state is the second state.

18. The repeater according to claim 13, wherein the first information or the second information is transmitted via fifth information, and the fifth information comprises at least one of radio resource control (RRC), configuration information, media access control control element (MAC CE), and downlink control information (DCI).

19. The repeater according to claim 14, the first information comprises time division duplex (TDD) configuration information; and the program or the instructions, when executed by the processor, cause the repeater to perform at least one of the following steps:

when the TDD configuration comprises an uplink (UL) configuration and/or a downlink (DL) configuration, determining that the target state is the first state;

when the TDD configuration comprises a flexible configuration, determining that the target state is the second state; or determining the target state based on a ratio of the TDD configurations, wherein the ratio of the TDD configurations is a ratio between a first configuration and a second configuration, the first configuration comprises an UL configuration and/or a DL configuration, and the second configuration comprises a flexible configuration.

20. A non-transitory readable storage medium, wherein the non-transitory readable storage medium stores a program or instructions, and the program or instructions, when executed by a processor, cause the processor to perform:

determining a target state based on first information indicated by a network-side device; and performing state switching based on the target state; wherein the target state comprises a first state or a second state, the first state indicates that a repeater amplifies and/or forwards an input signal, and the second state indicates that the repeater does not amplify and/or forward an input signal;

the first information comprises at least one of master cell group (MCG) configuration information, or secondary cell group (SCG) configuration information;

the program or the instructions, when executed by the processor, cause the processor to perform at least one of the following steps:

when both the MCG configuration information and the SCG configuration information indicate a state of the repeater being the second state, determining that the target state is the second state; or when the MCG configuration information or the SCG configuration information indicates the state of the repeater being the first state, determining that the target state is the first state.

* * * * *